March 6, 1956 C. BODENSTEIN 2,737,546

METHOD OF AND APPARATUS FOR SCANNING SIGNAL IMPULSE COMBINATIONS IN START-STOP TELEPRINTER SYSTEMS

Filed June 9, 1951 2 Sheets-Sheet 1

Inventor:
Camillo Bodenstein
By [signature] Atty.

March 6, 1956 C. BODENSTEIN 2,737,546

METHOD OF AND APPARATUS FOR SCANNING SIGNAL IMPULSE COMBINATIONS IN START-STOP TELEPRINTER SYSTEMS

Filed June 9, 1951 2 Sheets-Sheet 2

Inventor:
Camillo Bodenstein.
By. [signature] Atty.

United States Patent Office 2,737,546

Patented Mar. 6, 1956

2,737,546

METHOD OF AND APPARATUS FOR SCANNING SIGNAL IMPULSE COMBINATIONS IN START-STOP TELEPRINTER SYSTEMS

Camillo Bodenstein, Munich, Germany, assignor to Siemens & Halske Aktiengesellschaft, Munich, Germany, a corporation of Germany Application June 9, 1951, Serial No. 230,750

Claims priority, application Germany June 30, 1950

31 Claims. (Cl. 178—70)

This invention is concerned with a method of and apparatus for scanning signal impulse combinations in start-stop teleprinter systems.

The problem arises in such systems, e. g., incident to extended connections which include a plurality of line sections, of correcting the individual start-stop signals by means of regenerative repeaters disposed in a line section so as to eliminate distortions which may have been caused by the transmission in a preceding line section. Such a regenerative repeater comprises a scanning device which is started by the start signals of signal impulse combinations transmitted in nonsynchronous sequence and which thereupon scans the individual signal elements or impulses substantially accurately centrally thereof.

A similar problem is present in the case of the so-called reference distortion meters which are provided for measuring the reference distortion, i. e., the deviations of the central points of the signals from the initial flank of the starting signal.

Prior regenerative repeaters employ intermittently rotating devices, which operate in a similar manner as the receiving portion of a start-stop teleprinter, and also nonrotatable scanning means comprising relays or tube arrangements, or combinations of both, which, after operative release by the start signal produce a series of scanning impulses successively spaced in accordance with the intervals between the central points of the signal impulse elements. The recurring value of the spacing between the central points of regular signals may be referred to as the "element or signal center frequency." This frequency is thus twice that of the so-called "element or signal frequency."

It is difficult in such switching arrangements to maintain, without the use of rotating devices, sufficient accuracy with respect to the correct timing of the scanning impulses for the entire length of a signal impulse combination, and efforts have therefore been made to produce the correct mutual spacing between the scanning impulses by the use of a fixed, continuously effective auxiliary frequency. An arrangement of this kind operates with a tube circuit which is set in operation by the start signal and which thereupon, during the receipt of the impulse combination, generates scanning impulses by its tip frequency which is substantially approximated to the impulse center frequency, the object being to obtain a more accurate fixing of the individual scanning impulses by an auxiliary alternating voltage of high frequency which acts upon the tube circuit. The corresponding circuit requires for its operation a very accurate adjustment of the operating voltages, and yet it does not exclude erroneous scanning with deviations of one or more cycles of the auxiliary voltage, as the phase position of the tipping or triggering oscillation bears no fixed relation to the phase position of the auxiliary frequency.

It has also been proposed to control the scanning by means of an alternating current which oscillates constantly with the required scanning frequency. The auxiliary alternating current is in such cases made available in several phase positions, and that phase position is always selected by the start impulse which is most favorable for the scanning of the centers of the impulses of the corresponding signal combination. Such a system operates satisfactorily, but it necessitates a great expenditure for the switching means, because there must be provided at least one special selection relay and several switching contacts for each of the selectable phase positions.

It is further known to make the frequency of a constantly operating oscillator equal to an intergral multiple of the required scanning frequency which is determined by the signal impulse center frequency, and to start by the start impulse of each current impulse combination a frequency divider circuit which produces from the constantly effective oscillator frequency the scanning frequency corresponding to the signal center frequency, with a predetermined phase position relative to the starting signal. The resulting circuit arrangement is likewise relatively complicated and requires a great expenditure in switching elements.

The above indicated drawbacks of the known or heretofore proposed scanning methods may, in accordance with the invention, be overcome by making the scanning impulse frequency equal to an even or integral multiple of the signal center frequency and making in the scanning of a signal combination, after operation of a scanning impulse by the start signal, only the scanning impulses operatively effective which follow in intervals each of one signal length while suppressing those which are disposed between them. As will be presently seen, the use of this method results in a relatively simple circuit arrangement which operates reliably and substantially excludes phase errors in the scanning.

The new method may be realized by controlling the scanning circuit by switching means which coact in continuous pulsing manner with a scanning pulse frequency corresponding to an even multiple of the signal center frequency and which are operatively effective only during a scanning interval which is very short as compared with the signal length.

The effect of these switching means upon the scanning circuit is made dependent on additional switching means which are rendered effective by the starting signal of a signal combination and which are maintained operatively effective for an interval corresponding to the duration of the signal combination. These last mentioned switching means are preferably made with a response or energizing delay of about one-half of the signal length, so that the first scanning pulse which is selected by the start signal falls approximately within the center of the starting signal. This operation determines the operative effect of the first scanning impulse for the corresponding signal combination.

This first scanning impulse may, in accordance with the invention, be used for affecting further switching means which suppress in each case a certain number of impulses succeeding the selected scanning impulse and permit only the scanning impulse to become effective, which follows at an interval of a signal step length. The interplay is repeated during all of the following steps of the signal combination so that, of the scanning impulses becoming available in rapid succession, only the scanning impulses are selected which follow at intervals equal to the length of one signal, while the impulses disposed between them are prevented from affecting the scanning operation. The duration of a step or signal is thereby equal to the previously mentioned spacing between the centers of the signals, since it must be assumed that the signals are uniform and of constant length.

The foregoing and additional objects and features will appear from a description of examples of the invention which will presently be rendered with reference to the accompanying drawings. In these drawings, Fig. 1 is a circuit of a regenerative repeater embodying features of the invention and operating with relays;

Fig. 2 presents curves to illustrate the operation of the circuit shown in Fig. 1;

Figure 1:
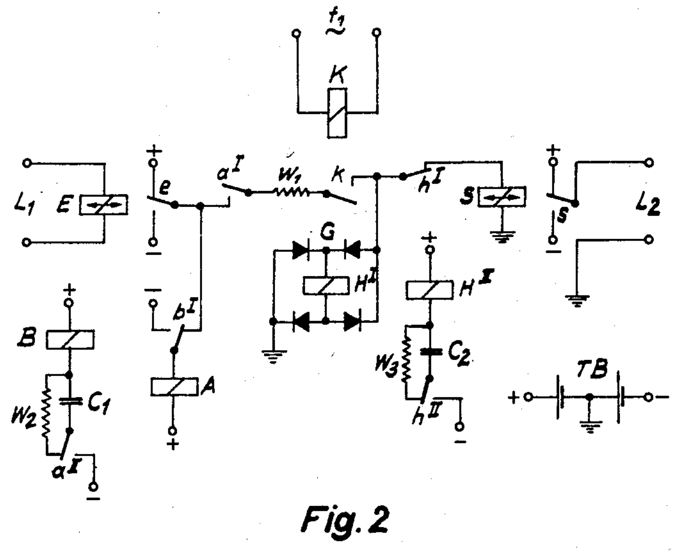

Referring now to Fig. 1, E is a polarized line or receiving relay which receives impulses of opposite polarity over a transmission line connected with the terminals $L_1$. The armature *e* is actuated responsive to operation of the relay E in accordance with the received signals, thereby alternately transmitting the signals to the polarized relay S by connecting positive and negative potentials from a battery (shown at TB) to a scanning circuit which extends over the contacts *e*, $a^I$, *k*, $h^I$ to the polarized relay S. The impulses of opposite polarity are re-transmitted by contact *s* of the relay S to a circuit connected to the terminals $L_2$ which may be, for example, a line section of a telegraph connection or the local circuit of a distortion meter. The corresponding circuit means may be of known types and therefore have not been illustrated.

The scanning circuit comprises the relay K which is energized by a periodic current of a frequency $f_1$ to actuate contact *k* periodically in accordance with such frequency. The corresponding frequency is an integral or even multiple of the scanning frequency determined by the spacing between the central points of the transmitted signal elements.

The contact *k* is, in the illustrated position of the line relay contact *e*, initially ineffective because of the open position of the contact $a^I$. When the line relay contact *e* is placed from its space into its alternate mark position by the start impulse of a signal combination, it will close a circuit for the energization of the control relay A over a path including the contact $b^I$ in its resting position, and relay A, responsive to its energization, closes its contact $a^I$ with a delay amounting to about half the length of the corresponding signal element. The next scanning impulse following this switching operation, which is produced by the contact *k*, can then become effective. The scanning circuit from the line relay contact *e* to the transmitting relay S is thus first switched through at the instant which falls (depending upon the response delay of relay A) approximately in the center of the start signal. Relay S, upon energizing, switches its contact *s* from the illustrated space position (positive potential) in the mark position (negative potential).

In addition to the contacts *k* and $a^I$, there is provided in the scanning circuit a further contact $h^I$ which is operable by the relay H having the windings $H^I$ and $H^{II}$, respectively. The winding $H^I$ is disposed in one arm of the rectifier bridge G having another arm connected at a mid-point between the contacts *k* and $h^I$. The effect of this rectifier circuit is that the relay H is briefly energized during the closure of contact $a^I$ responsive to each operation of the contact *k* independent of the prevailing position of the line relay contact *e*. If only the winding $H^I$ were provided, the contact $h^I$ would always be opened with a small displacement in time in step with the closures of the contact *k*. As shown, there is, however, provided a second winding $H^{II}$ which is affected by a second contact $h^{II}$ disposed in a separate circuit in which a capacitor $C_2$ lies in series therewith and with the winding $H^{II}$, the capacitance of $C_2$ being such that its charging current maintains for a predetermined interval the energization over the winding $H^{II}$. The period of delay is, in accordance with the invention, by a small amount shorter than the time corresponding to the length of a signal element.

The contact $h^I$ subsequent to an effective scanning impulse, by contact *k* and by the energization of relay H, remains open for substantially the duration corresponding to the length of one signal element, and therefore suppresses, after the first operatively effective scanning impulse, a certain number of further impulses produced by the relay K. Relay H deenergizes after an interval which substantially corresponds to the duration of a signal impulse, again closing the contact $h^I$ so that a scanning impulse of the contact *k* can again become effective. The time interval between this effective scanning impulse and the previously effective scanning impulse corresponds to the duration of one signal element, since the pulsing frequency of the contact *k* is an integral or even multiple of the scanning frequency. After deenergization of the relay H, the capacitor $C_2$ is discharged through the resistor $W_3$ over the resting position of the contact $h^{II}$.

The interplay between the contact *k* and the relay H is repeated for the duration of the receipt of the signal impulses, and each signal is thus scanned once centrally thereof. The interplay is interrupted upon return to resting position of the contact $a^I$. Such return is effected with a delay which may, by suitable auxiliary switching means, be adjusted to a time interval corresponding to the length of the entire signal combination.

As an example of such a delay or retardation means, there is shown in Fig. 1 an auxiliary relay B coacting with a capacitor $C_1$ which is controlled over a switching contact $a^{II}$ associated with the relay A. This contact $a^{II}$ is placed responsive to the energization of relay A by the start signal from its illustrated into its alternate position to connect with the negative potential of the battery. The relay B is energized by charging current of the capacitor $C_1$. The contact $b^I$ disconnects the winding of relay A from the line relay contact *e* and places it directly in a holding circuit to the negative potential of the battery, maintaining it energized for the duration of energization of relay B. The latter relay remains energized until such a time when the charging current of the condenser $C_1$ drops under a certain value. The corresponding time interval is such that the deenergization of the relay B falls within the stop signal element. Accordingly, upon restoration of the contact $b^I$, relay A will become deenergized, depending on the position of the line relay contact *e*; and its contacts $a^I$ and $a^{II}$ will restore to the normal positions shown. The capacitor $C^I$ is then discharged over the contact $a^{II}$ and the resistor $W_2$, thereby preparing relay B for subsequent operation.

Figure 2:
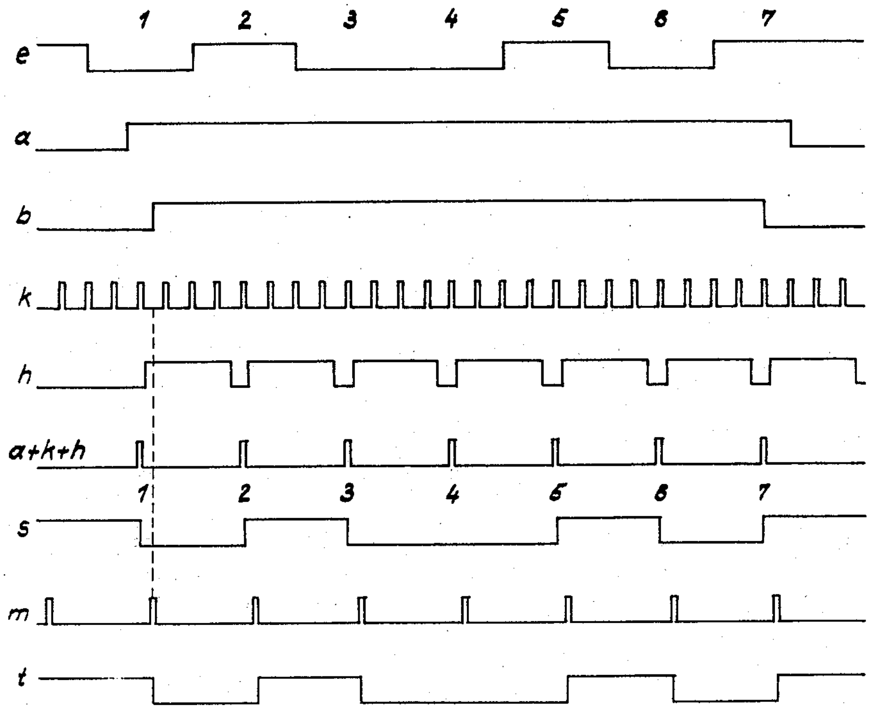

For the sake of clarity, the operations of the various switching elements are shown in Fig. 2 in the form of diagrammatic response curves.

The curve *e* of Fig. 2 indicates the operation of the line relay contact *e* responsive to receipt of an arbitrary assumed number of signal impulses. Numeral 1 denotes the start signal element; numerals 2–6 indicate the successive elements of a signal combination; and numeral 7 is the stop signal or element.

The curve *a* illustrates the operation of the relay A which energizes, as above explained, after the first switching over of the line relay contact *e* caused by the start signal, with a delay corresponding not quite to the length of one-half of the start signal element. The relay B, as indicated by the curve *b*, is shortly thereafter energized by the actuation of contact $a^{II}$ of relay A. The energized condition of relay B is, as previously described maintained for an interval so that its deenergization takes place during the stop signal 7, and relay A accordingly returns to normal as shown in curve *a* at an instance which corresponds to the center of the stop signal 7.

The curve *k* shows the operation of the relay K and its contact *k* with a scanning impulse frequency corresponding to an integral multiple of the signal or element center frequency, the operatively effective period always being short as compared with the intervals between the impulses.

The curve $h$ indicates the incidence of energization of the relay H and consequently operation of its contacts $h^{I}$ and $h^{II}$. It will be seen that the first response follows directly upon that scanning impulse of the curve $k$ which is in turn the scanning impulse following the operative response of relay A (curve $a$). The energization of relay H is maintained for a certain delay interval, as already explained, so that the scanning impulses $k$ which succeed the first selected scanning impulse $k$ are suppressed. Only after the expiration of this delay interval, which does not quite correspond to the length of a signal element, will the relay H deenergize, as shown in curve $h$. But the relay is thereafter again energized by the next effective scanning impulse $k$, again remaining energized for the duration of almost the length of a signal element. The interplay is repeated to the end of the signal combination, as indicated by the curve $h$.

The next curve, marked $a+k+h$, illustrates the total or combination effect of the response curves $a$, $k$, $h$. It will be seen that, due to the cooperation of the corresponding switching elements, i. e., the relays A, K, H and the contacts $a^{I}$, $k$, $h^{I}$ of Fig. 1, there is obtained a series of sharply defined scanning impulses marked 1–7, each of which falls in the center of a corresponding individual signal element of the signal combination (curve $e$) which is being received. Since each of these scanning impulses, as previously explained, results in a switching over of the transmission relay S into a position determined by the line relay contact $e$, the contact $s$ will produce a series of current impulses of alternately opposite polarity corresponding in form and sequence to the curve $e$, but in which distortions of the time limits of the signal elements, as they may occur in the input curve, are eliminated.

The accuracy with which the scanning impulses of the combined or resulting curve $a+k+h$ fall in the centers of the received signal elements of curve $e$ depends, as will be apparent, on the frequency of the scanning pulses $k$. The higher the frequency, the smaller will be the possible deviation between the moment of energization of relay A along the curve $a$ and the next following scanning impulse $k$ and therewith the deviation of the scanning impulse $a+k+h$ from the theoretical center of the signal element. However, no purpose is served by unduly increasing the scanning pulse frequency, because other uncertainties may thereby enter and because, at any rate, the spacing of the initial flank of the starting signal element from its center upon which the entire scanning operation depends, may already have been falsified to some extent by the distorting effect of the transmission means. The factor 4 employed in the example represents substantially the optimum value.

Figures 3, 4:
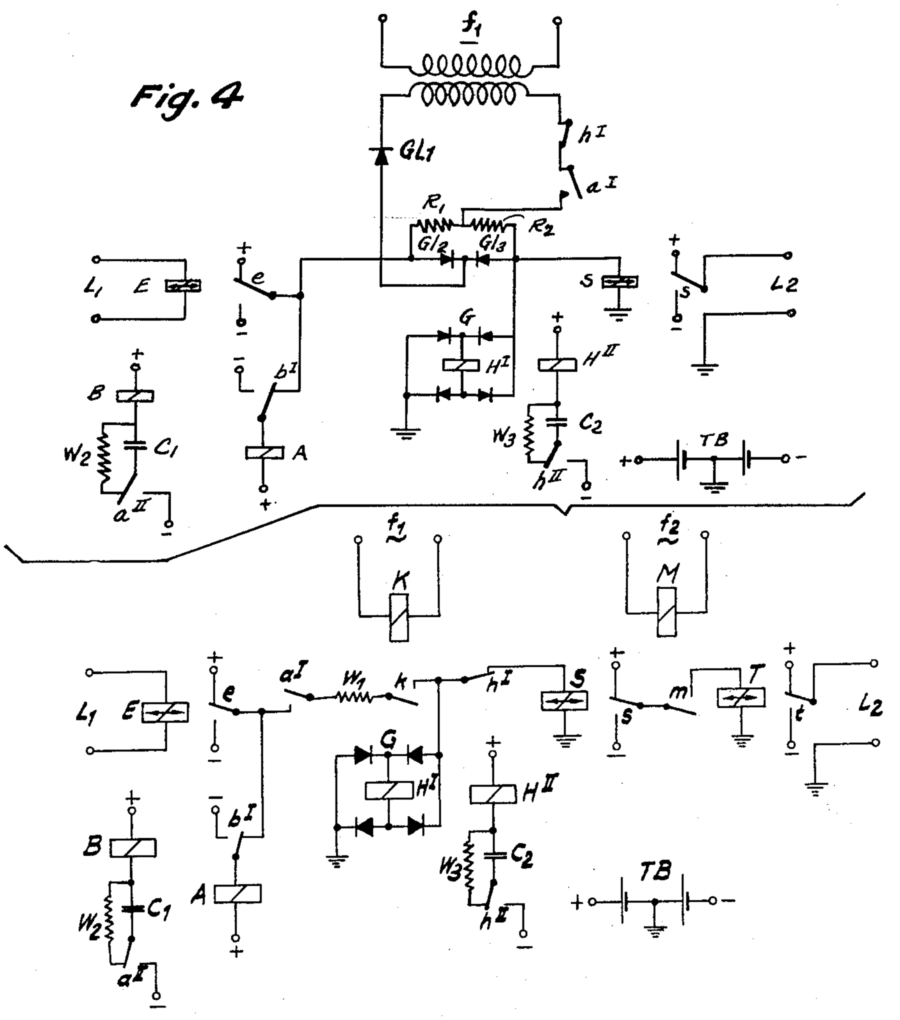
Fig. 3 is a modification of the circuit shown in Fig. 1.
Fig. 4 shows a modified repeater comprising rectifiers which function in place of moving contacts.

The switching arrangement according to the invention affords, in addition to what has been said, the possibility, as illustrated in Fig. 3, of producing a transition from the nonsynchronized start-stop transmission to a system synchronized with the signal element frequency by providing, in series relationship with the scanning and regenerative circuit of Fig. 1, a further simple scanning circuit which employs a continuous scanning pulse frequency which is substantially equal to the element center frequency.

In Fig. 3, there is provided a relay M which is energized by an auxiliary alternating current of a frequency $f_2$ corresponding to the element center frequency. The successive periods of energization of this relay M and therewith the closing of its contact $m$ are again of very short duration as compared with the length of the signal element, so that accurate scanning is effected. The contact $m$ is in series with the contact $s$ of the transmission relay S and also with an additional transmission or retransmission relay T which in turn retransmits the corrected current impulses of successively alternate opposite polarity by means of its contact $t$ to a circuit connected at the terminals $L_2$.

A particular phase synchronization of the auxiliary alternating current of the frequency $f_2$ in a dependent relationship on the actual operation periods of the contact $s$ is not effected. It is sufficient if the alternating current of the frequency $f_1$ bears a certain phase relationship to the alternating current of the frequency $f_2$ in such a manner that the scanning instants of the frequency $f_2$ fall between the scanning points of the frequency $f_1$.

The magnitude and phase of the frequency $f_2$ may be derived from a main or common synchronization system. The operations of the scanning contact $m$ and the transmission contact $t$ are in Fig. 2 indicated by the correspondingly marked curves $m$ and $t$, respectively. It will be seen that the scanning impulses $m$ can never fall on the flank of the corrected series of signal elements transmitted by contact $s$ even if they are derived from a common synchronization system, provided that the previously mentioned condition as to the phase relationship between the pulses $m$ and the pulses $k$ is observed.

This feature presents a particular advantage over previously known regenerator circuits, since the transition to a synchronous system is, in accordance with the invention, in a simple manner possible without the interposition of register or storage means.

The remaining provisions of the circuit shown in Fig. 3 correspond to those of Fig. 1, so that repetition of the description appears unnecessary.

In the circuits according to Figs. 1 and 3, the scanning means $k$ are illustrated as being contacts of the respective relays K, and the scanning means $m$ in Fig. 3 is similarly shown as a contact of relay M. Since the switching sequence of these contacts is very high and since high accuracy is required, it is suitable, and contemplated by the invention, to use in place of the electro mechanically operating contacts static scanning or switching means, e. g., comprising rectifiers, tubes and the like.

It is also possible to dispose the switches or contacts $a^{I}$ and $h^{I}$, which coact to furnish a combined effect, in the control circuit of the relay K or in the circuit of the static or contactless control means, rectifiers, tubes, etc., employed in its place so that only a single switch or switching element lies between the line relay contact $e$ and the transmission relay S, and the combined operative results required by the invention are effected in the circuit controlled by such switch or switching element. The advantage of the invention, according to which the precise position in point of time of the effective scanning impulses is determined by the impulses of a high frequency and is not impaired by the selection switching means, is also retained in this case.

Fig. 4 shows an example of a circuit according to the invention, in which rectifiers function in place of moving contacts.

Referring now to Fig. 4, it will be seen by comparison with Figs. 1 and 3 that the relay K and its contact $k$ have been substituted by a rectifier combination comprising the rectifiers $Gl_1$, $Gl_2$, $Gl_3$ in a circuit including the resistors $R_1$ and $R_2$ and the contacts $a^{I}$ and $h^{I}$ of the relays A and H, respectively, these contacts $a^{I}$ and $h^{I}$ corresponding to similarly marked contacts in Figs. 1 and 3. The remaining circuit provisions shown in Fig. 4 correspond to those also shown in Fig. 1. The operation of the circuit shown in Fig. 4 is as follows:

The path through the rectifier $Gl_3$ is originally blocked when the contact $e$ of the line relay E is in the position shown. The transmission relay S therefore is inoperative. The resistors $R_1$ and $R_2$ are of such values that the current flowing therethrough is insufficient to operate relay S. The control voltage $f_1$ remains without effect, because the contact $a^{I}$ is in this condition of the circuit open. If a signal impulse now arrives, the line relay E will operate and will switch over its contact $e$. As already described, the contact $a^I$ is now closed by the actuation of relay A. The next half-wave of the control voltage $f_1$, which is passed by the rectifier $Gl_1$, now affects the two rectifiers $Gl_2$ and $Gl_3$ in such a manner that they become conductive. The relay S accordingly operates and switches over its contact $s$ to the alternate position. As previously described, after the closure of contact $a^I$, the relay H will operate and open its contact $h^I$ after an interval of time, so that the control voltage $f_1$ can effect one scanning impulse. After the control voltage $f_1$ has become ineffective by the opening of the contact $h^I$, the rectifier circuit comprising the rectifiers $Gl_2$ and $Gl_3$ will again block the current flow. The blocking of the current is effective, depending on the position of the contact $e$ of the line relay, because the current is blocked in one direction by the rectifier $Gl_2$ and in the other direction by the rectifier $Gl_3$.

The rectifier $Gl_1$ merely has the object to surpass one of the two half-waves of the control voltage $f_1$, because only one half-wave is used for the control of the rectifiers $Gl_2$ and $Gl_3$, in accordance with the polarization of these rectifiers.

The remaining circuit means shown in Fig. 4 have the functions already described in connection with Fig. 1, and further discussion of these functions therefore is omitted. The function of the circuit will, it is believed, become immediately apparent when it is considered that the opening and blocking of the rectifiers for the current flow is equivalent to the operations effected in Fig. 1 by the opening and closing of the contact $k$ of the relay K.

Changes may be made within the scope and spirit of the accompanying claims.

I claim:

1. In a start-stop teleprinter repeater or the like, an input circuit comprising a line relay for receiving series of signal impulses, a circuit for scanning said signal impulses comprising a contact controlled by said line relay, a transmission relay for receiving scanning impulses from said scanning circuit, continuously operating pulsing means disposed in said scanning circuit, the frequency of said pulsing means being an integral multiple at least several times the frequency of said signal impulses, and switching control means also disposed in said scanning circuit for making impulses of said pulsing means effective for the operative actuation of said transmission relay only at instances which correspond substantially to the midpoints of the individual signal impulses.

2. The apparatus defined in claim 1, together with a re-transmission circuit which receives impulses from said transmission relay, pulsing switching means in said transmission circuit which pulses continuously at a frequency which corresponds substantially to the center frequency of said signals in said combinations, and a retransmission relay for receiving impulses from said transmission circuit.

3. In a start-stop teleprinter repeater or the like, an impulse source having a frequency which is an integral multiple at least several times the frequency of transmitted signals, a pulsing relay controlled by said impulse source, a scanning circuit comprising a pulsing contact governed by said pulsing relay, a transmission relay controlled by said scanning circuit, a line relay responsive to the transmitted signals and having a contact disposed in said scanning circuit in series relation with said pulsing contact, a holding relay, circuit means controlled by the contact of said line relay responsive to energization thereof upon receipt of the start signal of a signal impulse series to be transmitted for energizing said holding relay, said holding relay having a contact disposed in said scanning circuit for closing a point therein, a scanning control relay having a scanning control contact disposed in said scanning circuit in series with the pulsing contact of said pulsing relay, and circuit control means for governing the operation of said scanning control relay to operate said scanning control contact to select the first scanning pulse of said pulsing contact to become effective in said scanning circuit approximately midway of the length of said starting signal and to thereafter select for operative actuation of said transmission relay subsequent pulses produced by said pulsing contact which are spaced by intervals substantially corresponding to the length of the signals of said impulse series while suppressing pulses thereof which are disposed therebetween.

4. The apparatus defined in claim 3, comprising an auxiliary control relay for placing said holding relay in a holding circuit for the duration of the transmission of said signal impulse series.

5. The apparatus defined in claim 3, wherein said line relay and said transmission relay are differential relays.

6. The apparatus defined in claim 3, together with a contact controlled by said transmission relay for retransmitting the signals impressed thereon by the action of the contacts in said scanning circuit.

7. The apparatus defined in claim 3, wherein said scanning control relay comprises two windings disposed in separate control circuits.

8. The apparatus defined in claim 3, comprising a rectifier bridge connected with said scanning circuit, a winding of said scanning control relay being disposed in said bridge as an arm thereof.

9. The apparatus defined in claim 3, comprising a rectifier bridge connected with said scanning circuit, a winding of said scanning control relay being disposed in said bridge as an arm thereof, and a second winding forming part of said scanning control relay, said second winding being disposed in a separate circuit which is governed by a contact of said scanning control relay.

10. The apparatus defined in claim 3, together with a contact controlled by said transmission relay for retransmitting the signals impressed thereon by the action of the contacts in said scanning circuit, a second scanning circuit extending from such contact and terminating in a retransmission relay, a continuously pulsing contact in said second scanning circuit, and means for pulsing such pulsing contact at a frequency which substantially corresponds to the center frequency of said signals.

11. A start-stop regenerative repeater apparatus having an input circuit comprising a line relay for receiving series of signal impulses, a control circuit for scanning said signal impulses comprising a contact controlled by said line relay, a transmission relay for receiving impulses from said control circuit, an impulse source for continuously producing scanning impulses at a frequency which substantially equals an integral multiple at least several times the center frequency of said signal impulses, circuit means for delivering said scanning impulses to said control circuit, control means in said control circuit for supplying said scanning impulses continuously, and switching means cooperating with said control circuit for selecting from said scanning impulses for the operative actuation of said transmission relay only those of such impulses which occur in said control circuit at instances corresponding to the centers of the individual signal impulses of the series of signal impulses delivered to said line relay while suppressing scanning impulses disposed between such selected impulses.

12. The apparatus as defined in claim 11, wherein said circuit means includes a relay responsive to said impulse source, and a contact governed by said relay and disposed in said control circuit, said contact constituting said control means.

13. The apparatus as defined in claim 11, comprising a relay and circuit means therefor to cause it to energize in step with said selected scanning impulses, and a contact controlled by said relay which constitutes said switching means.

14. The apparatus as defined in claim 11, comprising a relay and circuit means therefor to cause it to energize in step with said selected scanning impulses, and a contact controlled by said relay which constitutes said switching means, said contact being disposed in said control circuit.

15. The apparatus as defined in claim 11, comprising a relay and circuit means therefor to cause it to energize in step with said selected scanning impulses, and a contact controlled by said relay which constitutes said switching means, said contact being disposed in said circuit means for delivering said scanning impulses to said control circuit.

16. The apparatus as defined in claim 11, comprising rectifiers disposed in said control circuit, said rectifiers constituting said control means.

17. The apparatus as defined in claim 11, comprising a relay and means for energizing it in step with said selected scanning impulses, and a contact controlled by said relay and disposed in said circuit means for delivering said scanning impulses to said control circuit, said contact constituting said switching means.

18. In the regenerative repeating of start-stop signals or the like, the method of scanning signal impulses which are delivered in non-synchronous sequence comprising the following steps, namely, (1) producing a continuous series of scanning control impulses of a frequency which substantially equals an integral multiple at least several times the center frequency of the delivered signal impulses, (2) selecting from said scanning control impulses a particular impulse by the start signal of the delivered signal impulse combination; and (3) thereafter during the scanning of the signal impulses of said combination making effective only the scanning control impulses following at intervals substantially equal to the length of signal impulses while suppressing the scanning control impulses disposed therebetween.

19. The method as set forth in claim 18, together with the further step, namely, (4) of converting into synchronous signals the impulses of the signal impulse combination delivered in non-synchronous sequence.

20. The method as set forth in claim 18, together with the further step, namely, (4) of additionally scanning the impulses of the signal impulse delivered in non-synchronous sequence for the purpose of converting such signal impulses to form synchronous signals.

21. The method as set forth in claim 18, together with the further step, namely, (4) of additionally scanning the impulses of the signal impulse combination transmitted in non-synchronous sequence for the purpose of converting such signal impulses to form synchronous signals, the frequency of said additional scanning bearing predetermined phase relationship to the frequency of the scanning control impulses produced in accordance with the requirement of the first step of claim 18.

22. The method as set forth in claim 18, together with the further steps, namely, (4) of producing a continuous series of additional scanning control impulses having a frequency which bears a predetermined phase relationship to the frequency of the scanning control impulses produced in accordance with the requirements of the first step of claim 18; and (5) employing said additional scanning control impulses for additionally scanning the impulses of said signal combinations by disposing the effective scanning points thereof between the effective scanning points of the scanning effected in accordance with the requirements of the third step of claim 18 for the purpose of converting said non-synchronously transmitted signal combination to form synchronous signals.

23. In a regenerative start-stop signal impulse repeater or the like, means for producing a continuous series of scanning control impulses of a frequency which substantially equals an integral multiple at least several times the center frequency of the delivered signal impulses, relay means controlled by the start impulse of the delivered signal impulse combination for selecting a scanning control impulse to take effect in the scanning of the signal impulses of the combination, and means for thereafter making effective for the scanning of the impulses of said combination only the scanning control impulses which follow at intervals substantially equal to the length of the signal impulses of said combination while suppressing the scanning control impulses disposed therebetween.

24. The structure as set forth in claim 23, comprising a scanning circuit including a switching contact which pulses continuously at said frequency which equals an integral multiple at least several times the center frequency of the delivered signal impulses, and circuit means for making said switching contact successively operatively effective only for scanning periods which are appreciably shorter than the length of the signal impulses.

25. The structure as set forth in claim 23, comprising a scanning circuit including a switching contact which pulses continuously at said frequency which equals an integral multiple at least several times the center frequency of the delivered signal impulses, circuit means for making said switching contact successively operatively effective only for scanning periods which are appreciably shorter than the length of the signal impulses, and additional relay means operated responsive to the start signal for maintaining the actuation of said first named relay means for the duration of delivery of a signal impulse combination.

26. The structure as set forth in claim 23, comprising a scanning circuit including a switching contact which pulses continuously at said frequency which equals an integral multiple at least several times the center frequency of the delivered signal impulses, circuit means for making said switching contact successively operatively effective only for scanning periods which are appreciably shorter than the length of the signal impulses, and additional relay means operated responsive to the start signal for maintaining the actuation of said first named relay means for the duration of delivery of a signal impulse combination, said additional relay means being slow to operate by a value which corresponds approximately to one-half the length of a signal impulse for the purpose of making the first scanning control impulse effective approximately mid way of the start impulse.

27. The structure as set forth in claim 23, comprising a scanning circuit including a contact which pulses continuously at said frequency which equals an integral multiple at least several times the center frequency of the delivered signal impulses, and an additional slow-to-operate and slow-to-release relay comprising a contact disposed in circuit with said continuously pulsing contact, the slow-to-release value of said additional relay exceeding the slow-to-operate value thereof.

28. The structure as set forth in claim 23, comprising a scanning circuit including a contact which pulses continuously at said frequency which equals an integral multiple at least several times the center frequency of the delivered signal impulses, an additional relay which is slow-to-release by a value correspondingly nearly to the length of a signal impulse, and a contact controlled by said additional relay for governing the operation of said first named relay means.

29. The structure as set forth in claim 23, comprising means for additionally scanning the signal impulses subsequent to the scanning thereof by the means as recited in claim 23, said last-named means having a scanning frequency which corresponds to the center frequency of said signals.

30. The structure as set forth in claim 23, comprising means for additionally scanning the signal impulses subsequent to the scanning thereof by the means as recited in claim 23, said last-named means having a scanning frequency which corresponds to the center frequency of said signals and which is in predetermined phase relationship to the scanning impulses specified in claim 23.

31. The structure as set forth in claim 23, comprising means for additionally scanning the signal impulses subsequent to the scanning thereof by the means as recited in claim 23, said means including a scanning frequency which corresponds to the center frequency of said signals, the operatively effective scanning instants of said scanning frequency being disposed between the operatively effective scanning instants of said first scanning frequency.

References Cited in the file of this patent

UNITED STATES PATENTS

| | | |
|---|---|---|
| 2,430,547 | Anderson et al. | Nov. 11, 1947 |
| 2,474,490 | Pelle | June 28, 1949 |
| 2,502,942 | Goodall | Apr. 4, 1950 |
| 2,599,345 | Oberman | June 3, 1952 |